(12) United States Patent
Samudrala et al.

(10) Patent No.: US 11,063,786 B2
(45) Date of Patent: Jul. 13, 2021

(54) APPARATUS AND METHOD FOR INTEGRATING LONG-RANGE WIRELESS DEVICES IN INDUSTRIAL WIRELESS NETWORKS

(71) Applicant: Honeywell International Inc., Morris Plains, NJ (US)

(72) Inventors: Prasad Samudrala, Bangalore (IN); Paul F. McLaughlin, Ambler, PA (US); Vibhor Tandon, Dubai (AE)

(73) Assignee: Honeywell International Inc., Charlotte, NC (US)

( * ) Notice: Subject to any disclaimer, the term of this patent is extended or adjusted under 35 U.S.C. 154(b) by 14 days.

(21) Appl. No.: 16/670,090

(22) Filed: Oct. 31, 2019

(65) Prior Publication Data

US 2020/0145257 A1    May 7, 2020

Related U.S. Application Data

(60) Provisional application No. 62/754,059, filed on Nov. 1, 2018.

(51) Int. Cl.
| | |
|---|---|
| *H04L 12/66* | (2006.01) |
| *H04W 88/16* | (2009.01) |
| *H04L 12/28* | (2006.01) |
| *H04W 84/18* | (2009.01) |
| *H04W 40/22* | (2009.01) |

(52) U.S. Cl.
CPC .......... *H04L 12/66* (2013.01); *H04L 12/2854* (2013.01); *H04W 88/16* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2014/0355581 | A1* | 12/2014 | Pulini | H04L 69/18 370/338 |
| 2017/0061131 | A1* | 3/2017 | Santos | G06F 21/577 |
| 2019/0045034 | A1* | 2/2019 | Alam | H04L 67/30 |

* cited by examiner

*Primary Examiner* — Hong S Cho
(74) *Attorney, Agent, or Firm* — Paschall & Associates, LLC; Anthony Miologos (57) ABSTRACT

This disclosure provides an apparatus and method for integrating long-range wireless devices in industrial wireless networks. A wireless device manager is configured to function as a gateway for at least one industrial wireless network. The gateway is associated with at least one industrial wireless network protocol; and the wireless device manager comprises a first radio module configured to communicate directly with one or more devices over a distance of at least about two kilometers using a long-range wide area network protocol.

13 Claims, 5 Drawing Sheets

APPARATUS AND METHOD FOR INTEGRATING LONG-RANGE WIRELESS DEVICES IN INDUSTRIAL WIRELESS NETWORKS

CROSS-REFERENCE

This application claims priority from provisional application 62/754,059, filed Nov. 1, 2019, which is incorporated herein in its entirety.

TECHNICAL FIELD

This disclosure relates generally to industrial process control and automation systems. More specifically, this disclosure relates to an apparatus and method for integrating long-range wireless devices in industrial wireless networks.

BACKGROUND

Industrial process control and automation systems are often used to automate large and complex industrial processes. These types of systems routinely include various components including sensors, actuators, and process controllers. Some of the process controllers can receive measurements from the sensors and generate control signals for the actuators.

While originally viewed negatively due to actual or perceived concerns over reliability, it has become common for wireless devices to be used for data acquisition and monitoring functions in control and automation systems. Data acquisition functions generally relate to capturing data associated with one or more industrial processes and relaying that data to one or more destinations. Monitoring functions generally relate to monitoring the operation of one or more industrial processes in order to identify abnormal or other conditions associated with the industrial processes.

Today, there are two major industrial wireless standards used in the process automation industry (WirelessHART and ISA 100 Wireless). Both protocols can be used to form multi-hop, self-forming, self-healing, tightly time-synced mesh networks. Honeywell OneWireless Release 300 (R300) and later releases support both of these protocols in a single wireless gateway.

Both of these protocols use the IEEE 802.15.4 physical layer, which enables a transmission distance of about 300 meters to about 350 meters line-of-sight between any two nodes (one hop). To achieve a distance of two kilometers, a mesh has to be formed using seven or eight hops. Some disadvantages with the prior art mesh networks include the issue of a battery-powered router being close to an access point has to forward its own packets to a gateway and all of its down-hope transmitter packets to the gateway and to other transmitters in both directions. This draws battery power very quickly and can cause the router's battery to die within a relatively short period of time such as a few months. This problem increases as the number of transmitters increases.

The overall capacity of a network can drop to a maximum of tens or several hundred nodes when the maximum hop size is higher, due to higher bandwidth consumption or capacity limitations in routers closer to their access points. This limits the capacity of the network, which can lead to the installation of many more battery-powered routers in lower hops (whether or not a need is there). Assuming end sensor nodes are installed two kilometers from a control room, there are typically no requirements to install sensors between the control room and those end sensor nodes to cover the distance. Multiple routers therefore need to be installed between the control room and the end sensor nodes to achieve the desired range, which can greatly increase costs. Moreover, since these battery-powered routers are being used with no associated process elements to sense (just to route data), the network becomes bigger in size and harder to maintain. Packet-forwarding over multiple hops uses a time slot in each hop to receive data and another time slot in each hop to transmit the data to the next hop until the data reaches a final access point. This adds to the latency of each packet as that packet traverses through the mesh until it reaches a gateway.

SUMMARY

This disclosure provides an apparatus and method for integrating long-range wireless devices in industrial wireless networks.

In an embodiment, the apparatus comprises a wireless device manager configured to function as a gateway for at least one industrial wireless network, the gateway is associated with at least one industrial wireless network protocol; and the wireless device manager comprises a first radio module configured to communicate directly with one or more devices over a distance of a few kilometers using a long-range low power wide area network protocol. The wireless device manager may be configured to communicate directly with the one or more wireless devices over a distance of between about 2 to 1,000 kilometers, 50 to 800 kilometers, or 100 to 500 kilometers. The wireless device manager may be configured to function as a gateway for an ISA100 network; a gateway for a WirelessHART network; and a gateway and an application server for the one or more devices. The wireless device manager may further comprise a second radio module configured to communicate directly with one or more nearby second devices using at least one industrial wireless protocol; and the wireless device manager may be further configured to function as an access point and field router for the one or more second devices. The first radio module may form at least a part of an access point; and the access point may be further configured to communicate directly with one or more nearby second devices using at least one industrial wireless protocol. The access point may be configured to use smaller industrial wireless protocol packet sizes when communicating at lower data rates using the long-range wide area network protocol compared to using the at least one industrial wireless protocol. The wireless device manager may be configured to receive process variable measurements from the one or more devices only when the one or more devices have determined that the process variable measurements have changed by a specified amount.

Another embodiment is a method comprising operating a wireless device manager as a gateway for at least one industrial wireless network, the gateway associated with at least one industrial wireless network protocol; and operating a first wireless radio of the wireless device manager to communicate directly with one or more devices over a distance of at least about two kilometers using a long-range wide area network protocol. The wireless device manager may communicate directly with the one or more devices over a distance of about ten kilometers. The wireless device manager may function as a gateway for an ISA100 network; a gateway for a WirelessHART network; and a gateway and an application server for the one or more devices. The method may further comprise operating a second wireless radio of the wireless device manager to communicate directly with one or more nearby second devices using at least one industrial wireless protocol; wherein the wireless device manager further functions as an access point and field router for the one or more second devices. The first radio module may form at least part of an access point; and the access point may communicate directly with one or more nearby second devices using at least one industrial wireless protocol. The access point uses smaller industrial wireless protocol packet sizes when communicating at lower data rates using the long-range wide area network protocol compared to using the at least one industrial wireless protocol. The method may further comprises receiving process variable measurements from the one or more devices only when the one or more devices have determined that the process variable measurements have changed by a specified amount.

The invention may further comprise a non-transitory computer readable medium containing instructions that, when executed by at least one processing device, causes the at least one processing device to perform the method described above.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 to 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, it has become common for wireless devices to be used for data acquisition and monitoring functions in industrial process control and automation systems. However, wireless devices (such as ISA100 devices and Wireless Highway Addressable Remote Transducer or "WirelessHART" devices) used in today's industrial process control and automation systems have a limited range for wireless communications. For example, some wireless devices may only be able to transmit wireless signals over a range of about 300 meters to about 350 meters line-of-sight. This can be due to several factors, such as the need to keep transmission power low in order to prolong the operational lifespans of batteries or other power supplies in the wireless devices. If a longer distance is needed (such as about two kilometers), it is common for multiple devices (such as six or seven devices) to be placed in series to support communications over the longer distance. Unfortunately, this approach comes with disadvantages such as a battery-powered router close to an access point having to be forwarded its own packets to a gateway and all of its down-hop transmitter packets to the gateway and to other transmitters in both directions. This draws battery power very fast and can cause the router's battery to die within a relatively short time period (such as a few months). This problem increases as the number of transmitters increases, even in lower-hop routers. The overall capacity of a network can drop to a maximum of tens or several hundred nodes when the maximum hop size is higher, due to higher bandwidth consumption or capacity limitations in routers closer to their access points. This limits the capacity of the network, which can lead to the installation of many more battery-powered routers in lower hops (whether or not a need is there).

Assuming end sensor nodes are installed two kilometers from a control room, there are typically no requirements to install sensors between the control room and those end sensor nodes to cover the distance. Multiple routers therefore need to be installed between the control room and the end sensor nodes to achieve the desired range, which can greatly increase costs. Moreover, since these battery-powered routers are being used with no associated process elements to sense (just to route data), the network becomes bigger in size and harder to maintain.

Packet-forwarding over multiple hops uses a time slot in each hop to receive data and another time slot in each hop to transmit the data to the next hop until the data reaches a final access point. This adds to the latency of each packet as that packet traverses through the mesh until it reaches a gateway.

This disclosure provides various architectures for gateways or other devices, where the architectures support wireless communications using (i) at least one long-range wireless network protocol and (ii) one or more industrial wireless network protocols. For example, the architectures could support one or both of an ISA100 wireless protocol and a WirelessHART protocol, along with a Long Range Wide Area Network (LoRaWAN) protocol. As a result, these architectures can be used to allow gateways or other devices to communicate with remote devices (located farther from the gateways) using the long-range wireless network protocol(s). The gateways or other devices can also be used to communicate with local devices (located closer to the gateways) using the industrial wireless network protocol(s). In some embodiments, for example, a long-range wireless network protocol could be used to support wireless communications with remote devices located up to about ten kilometers or more from a gateway. This disclosure also provides for mechanisms to control the rate at which data associated with the remote devices is transmitted. Among other things, these approaches can be used to support wireless communications with remote devices over longer distances, so there may be little or no need to include repeaters or other devices to support these communications. Additional benefits include the ability to employ an Industrial Internet of Things (IIOT)-driven architecture. This approach can provide very long range (up to about 10 kilometers or more) which can be due to a large link budget (such as about 155 dB) and receiver sensitivity (such as about −133 dBm). They can have higher capacity (such as thousands of nodes) in a single network/WDM. Low power can be used and they can be used with longer sleeping sensors (such as sensors having one update in an hour or day). The sensors can provide longer battery life (such as up to 10 years or more). There can be lower infrastructure costs (such as by enabling topologies such as star networks). The LoRaWAN sensors can use one or multiple license-free ISM frequency bands (such as 868 MHz in EU, 915 MHz in US, and 430 MHz in Asia). It can be used with an open standard and can be supported by many silicon vendors (such as Semtech, Microchip, MuRata, Embit, ST MicroELECTRONICS, etc.). The sensors can be used with multi-level security applications and networks (such as AES-128 bit or AES-256 bit) and can support higher data rates, such as between 250 bps and 50 kbps (can be in the range of 1 kbps for long distances). They can be used in numerous products from multiple vendors.

Figure 1:
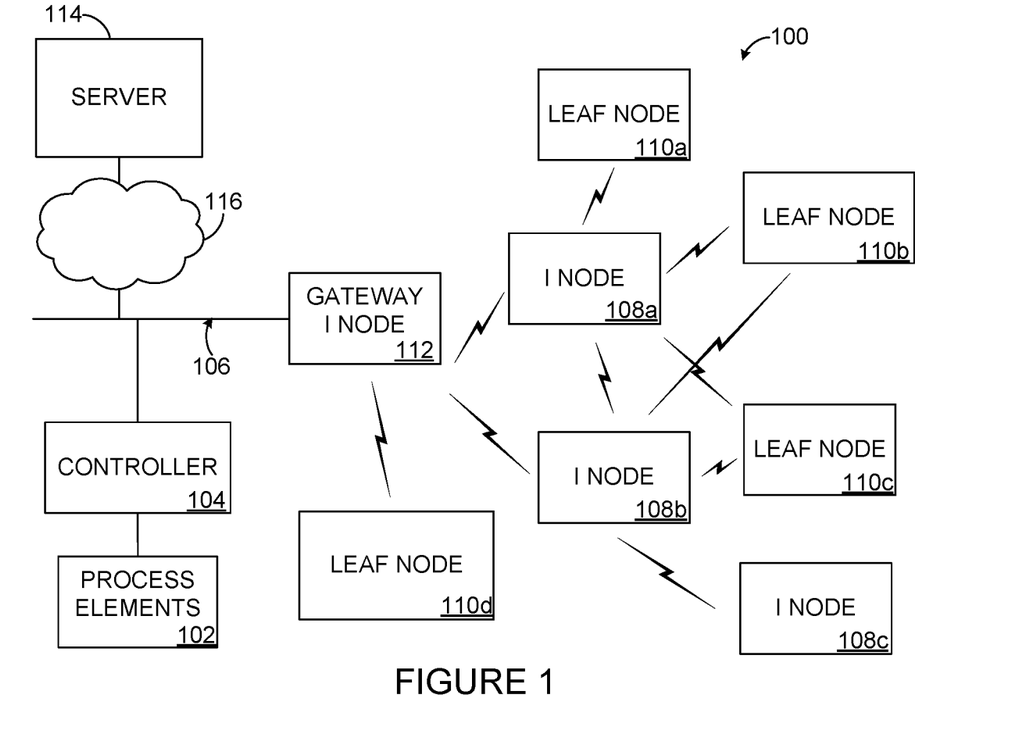
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

At least one controller 104 is coupled to the process elements 102. Each controller 104 controls the operation of one or more of the process elements 102. For example, the controller 104 could receive information associated with the process system, such as sensor measurements from some of the process elements 102. The controller 104 could use this information to generate control signals for others of the process elements 102, such as actuators, to thereby adjust the operation of those process elements 102. Each controller 104 includes any suitable structure for controlling one or more process elements 102. Each controller 104 could, for example, represent a computing device executing multivariable or other control logic.

At least one network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations.

As shown in FIG. 1, the system 100 also includes one or more wireless networks for communicating with wireless sensors or other wireless field devices. In this example, the wireless network includes one or more infrastructure nodes ("I nodes") 108a-108c, one or more leaf nodes 110a-110d, and one or more gateway infrastructure nodes 112.

The infrastructure nodes 108a-108c and leaf nodes 110a-110d engage in wireless communications with each other. For example, the infrastructure nodes 108a-108c may receive data transmitted over the network 106 (via a gateway infrastructure node 112) and wirelessly communicate the data to the leaf nodes 110a-110d. Also, the leaf nodes 110a-110d may wirelessly communicate data to the infrastructure nodes 108a-108c for forwarding to the network 106 (via a gateway infrastructure node 112). In addition, the infrastructure nodes 108a-108c may wirelessly exchange data with one another. In this way, the nodes 108a-108c, 112 (and optionally the nodes 110a-110d) form a wireless network capable of providing wireless coverage to leaf nodes and other devices in a specified area, such as a large industrial complex.

In this example, the nodes 108a-108c and 110a-110d are divided into infrastructure nodes and leaf nodes. The infrastructure nodes 108a-108c typically represent routing devices that can store and forward messages for other devices. On the other hand, the leaf nodes 110a-110d are generally non-routing devices that do not store and forward messages for other devices (although they could) and include field devices or field instruments. Infrastructure nodes 108a-108c can be line-powered devices (meaning these nodes receive operating power from an external source) or powered by local power supplies (such as internal batteries or other internal power supplies). Leaf nodes 110a-110d typically represent devices powered by local power supplies. Leaf nodes 110a-110d are often more limited in their operations, such as to help preserve the operational life of their power supplies.

The nodes 108a-108c and 110a-110d include any suitable structures facilitating wireless communications, such as radio frequency (RF) frequency-hopping spread spectrum (FHSS), direct sequence spread spectrum (DSSS), chirp spread spectrum (CSS), or any other frequency modulation transceivers. The nodes 108a-108c and 110a-110d could also include other functionality, such as functionality for generating or using data communicated over the wireless network. For example, the leaf nodes 110a-110d could include wireless sensors used to measure various characteristics within an industrial facility. The sensors could collect and communicate sensor readings to the controller 104 via the wireless network. The leaf nodes 110a-110d could also include wireless actuators that receive control signals from the controller 104 and that adjust the operation of the industrial facility. In this way, the leaf nodes may include or operate in a similar manner as the process elements 102 physically connected to the controller 104. The leaf nodes 110a-110d could further include handheld user devices (such as INTELATRAC devices from HONEYWELL INTERNATIONAL INC.), mobile stations, programmable logic controllers, process controllers, or any other or additional devices. The infrastructure nodes 108a-108c, 112 may also include any of the functionality of the leaf nodes 110a-110d or the controller 104.

The gateway infrastructure node 112 functions as an infrastructure node and communicates wirelessly with, transmits data to, and receives data from one or more infrastructure nodes and possibly one or more leaf nodes. The gateway infrastructure node 112 also converts data between protocol(s) used by the network 106 and protocol(s) used by the nodes 108a-108c and 110a-110d. For example, the gateway infrastructure node 112 could convert Ethernet-formatted data transported over the network 106 into one of multiple wireless protocol formats used by the nodes 108a-108c and 110a-110d. The gateway infrastructure node 112 could also convert data received from one or more of the nodes 108a-108c and 110a-110d into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

The system 100 here also includes one or more servers 114. Each server 114 denotes a computing device that executes applications for users or other applications. The applications could be used to support various functions for the controllers 106, the wireless network, or other components of the system 100. Each server 114 could represent a computing device running a WINDOWS operating system or other operating system. Note that while shown as being local within the control and automation system 100, the functionality of the server 114 could be remote from the control and automation system 100. For instance, the server 114 could be communicatively coupled to the system 100 via at least one network 116. This may allow, for instance, the server 114 to be remote from the system 100. This may also allow the functionality of the server 114 to be implemented in a computing cloud. If the server 114 is remote, a gateway could be positioned between the networks 106 and 116 to restrict access to the system 100.

At least one of the nodes forming the wireless network here support wireless communications using one or more industrial wireless network protocols and at least one long-range wireless network protocol. For example, each of these nodes could support one or both of an ISA100 wireless protocol and a WirelessHART protocol, and each of these nodes could support an LoRaWAN protocol. As particular examples, each of the infrastructure nodes 108a-108c could support this functionality to communicate with local and remote leaf nodes 110a-110d. As another particular examples, each of the gateway infrastructure nodes 112 could support this functionality to communicate with local and remote leaf nodes 110a-110d, along with providing additional functionality (such as gateway and network manager functions). Additional details regarding functionality that can be integrated into or used with an infrastructure node, gateway infrastructure node, or other node are provided in the attached Appendix.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated in FIG. 1 as being used along with a wired controller 104 and wired process elements 102, the wireless network could be used without any wired process elements or controllers. In addition, FIG. 1 illustrates one example operational environment where long-range wireless devices can be integrated in industrial wireless networks. This functionality can be used in any other suitable system.

Figure 2:
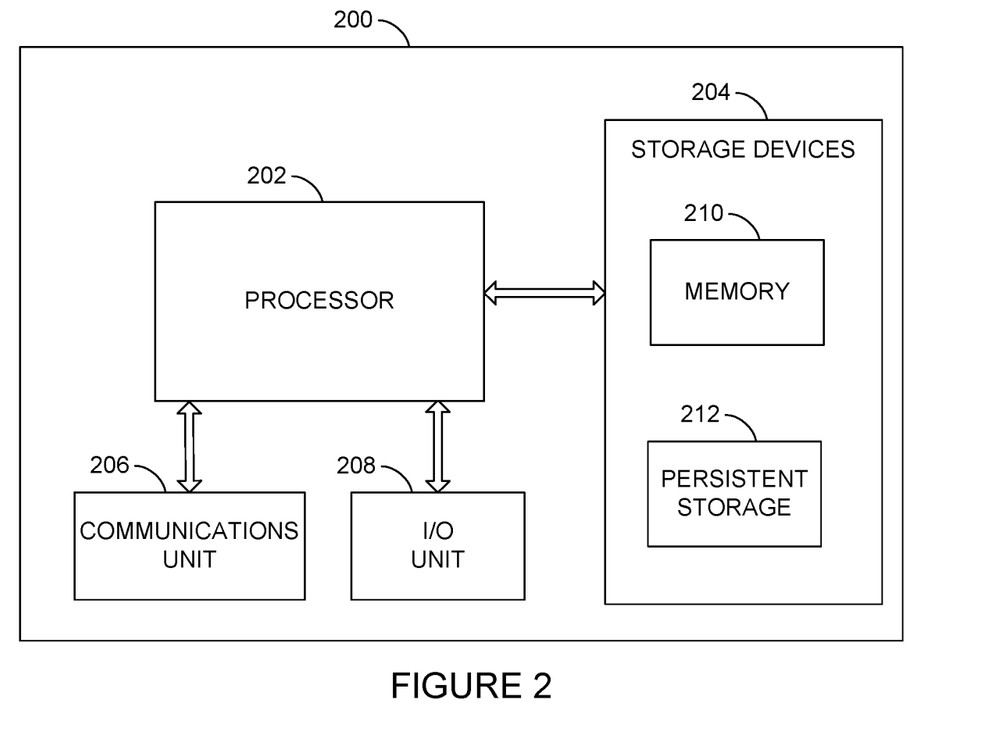
FIG. 2 illustrates an example device supporting long-range wireless communications in an industrial control and automation system according to this disclosure.

FIG. 2 illustrates an example device 200 supporting long-range wireless communications in an industrial control and automation system according to this disclosure. For ease of explanation, the device 200 is described as being used in the industrial control and automation system 100 of FIG. 1. The device 200 could, for example, represent at least part of an infrastructure node, gateway infrastructure node, leaf node, or server in FIG. 1. However, the device 200 could be used in any other suitable system and could represent any suitable device in that system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry. The processor 202 could execute any suitable instructions, such as those implementing a wireless network manager, a wireless network gateway, a network server, or an application server.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

Each communications unit 206 supports communications with other systems or devices. For example, at least one communications unit 206 could include one or more wireless radios and support mechanisms to enable communications using both (i) one or more industrial wireless network protocols and (ii) at least one long-range wireless network protocol. Each communications unit 206 may support communications through any suitable physical or wireless communication link(s).

Each I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the device 200 is accessible locally or remotely over a network connection.

Although FIG. 2 illustrates one example of a device 200 supporting long-range wireless communications in an industrial control and automation system, various changes may be made to FIG. 2. For example, various components in FIG. 2 could be combined, further subdivided, or omitted and additional components could be added according to particular needs. Also, computing and communication devices can come in a wide variety of configurations, and FIG. 2 does not limit this disclosure to any particular configuration of computing or communication device.

This disclosure describes features of a long range, low power, longer battery life industrial wireless solution based on Long Range Wide Area Network (LoRaWAN) technology, which can be integrated into a multi-protocol device (such as a gateway supporting WirelessHART and ISA100 Wireless). The multi-protocol device can therefore, in some embodiments, be integrate into a HONEYWELL ONE-WIRELESS infrastructure and a HONEYWELL Experion-PKS™ distributed control system (DCS) as well with other infrastructure systems and other distributed control systems. This solution enables battery-powered wireless sensors to communicate up to about ten kilometers or more in distance (without using any repeaters) and to achieve a long battery life (such as up to ten years or more).

The solution provided herein enables a number of possible applications such as remote wellhead monitoring for up to ten kilometers or more, remote pipeline monitoring, remote control applications and long distance terminal applications.

Figure 3:
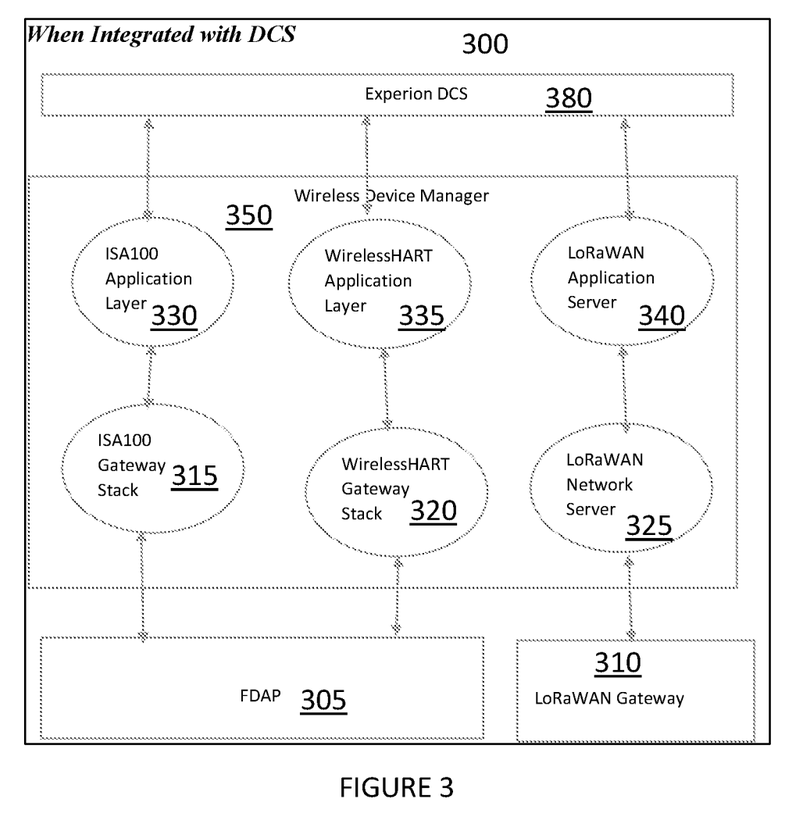
FIG. 3 shows an example of a wireless device manager architecture for LoRaWAN sensors.

A HONEYWELL Wireless Device Manager supporting LoRaWAN sensors along with ISA100+WirelessHART sensors may be used in a single WDM hardware instance. An existing wireless sensor mesh network with both ISA 100 and WirelessHart components may be used for communicating at 2.4 GHZ 330 with a wireless device manager and access points that may include an ISA 100 WirelessHart network manager and a LoRa sensors network, security and an application manager that communicates with LoRa based star topology Wireless sensor network 320 through LoRa on 915/868/430 MHz ISM. An example 300 is shown in FIG. 3 in which FDAP 305 communicates with ISA100 Gateway stack 315 and WirelessHART Gateway stach 320. LoRaWAN Gateway 310 communicates with LoRaWAN network server 325. Also within wireless device manager 335 are shown ISA application layer 330, wirelessHART application layer 335 and LoRaWAN application server 340. All of the communications are then sent to ExperionPKS™ DCS 380 or other distributed control system.

In another embodiment, a single WDM may be supporting both LoRa+existing sensor network. In some embodiments, a LoRaWAN gateway module (such as a CISCO or SAMTECH or other vendor gateway module) can be integrated with a WDM, like a HONEYWELL ONEWIRELESS FIELD DEVICE ACCESS POINT (FDAP) at an Level 1 switch. This brings LoRaWAN-enabled sensor data into the WDM and then tightly integrates the sensor data back into the ExperionPKS™ DCS system. In considering a real LoRaWAN architecture, it comprises one or more LoRaWAN sensors, one or more LoRaWAN gateway modules, at least one network server, and at least one application server.

Figure 4:
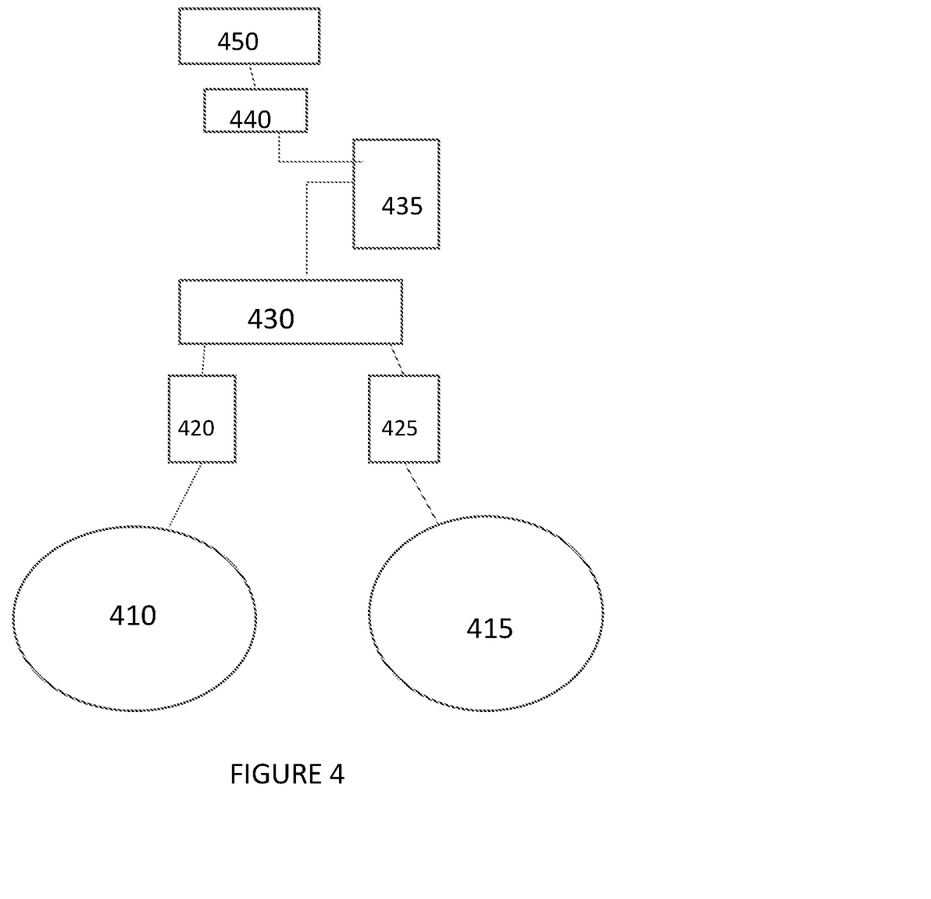
FIG. 4 shows an example of a wireless device manager in a cloud-based environment.

In some embodiments, the LoRaWAN sensors could represent wireless transmitters, each including or supporting a LoRaWAN radio module. In some embodiments, the LoRaWAN gateway could represent CISCO gateway hardware. In some embodiments, the WDM could implement a network server and application server software to decrypt and parse the sensor data and integrate the sensor data with the DCS. An example of these embodiments is shown in FIG. 4 where ISA100 and wirelessHART transmitters are collectively within cloud 410 and a group of LoRa enabled transmitters 415 are shown. The group of transmitters within cloud 410 communicate over 802.15.4 to FDAP 420 which then communicates to Field Device Network (FDN) Switch A 430. The group of LoRa enabled transmitters 415 then communicate over LoRa to a LoRaWAN gateway 425 which also sends its communications to FDN Switch A 430. Then the signals go to a DCS 435 to a Special Interface Network (SIN) Switch A 440 and then to an LoRaWAN application server to collect all of the communications to and from the transmitters.

In some embodiments, a LoRa radio module can be designed with the same form factor as the ISA100 radio module. This enables the wireless transmitters to support different protocols (ISA100 or LoRa) depending on which radio module is included (or multiple protocols if multiple radio modules are included). In particular embodiments, there may be no need to change the electronics of the wireless transmitters except for the antenna. Based on the country in which the device is used and the operating frequency of the LoRa hardware (such as 2400 MHz, 915 MHz, 868 MHz, or 433 MHz), the specific antenna can be selected for the appropriate frequency and installed with the wireless transmitters (such as in the factory).

Figure 5:
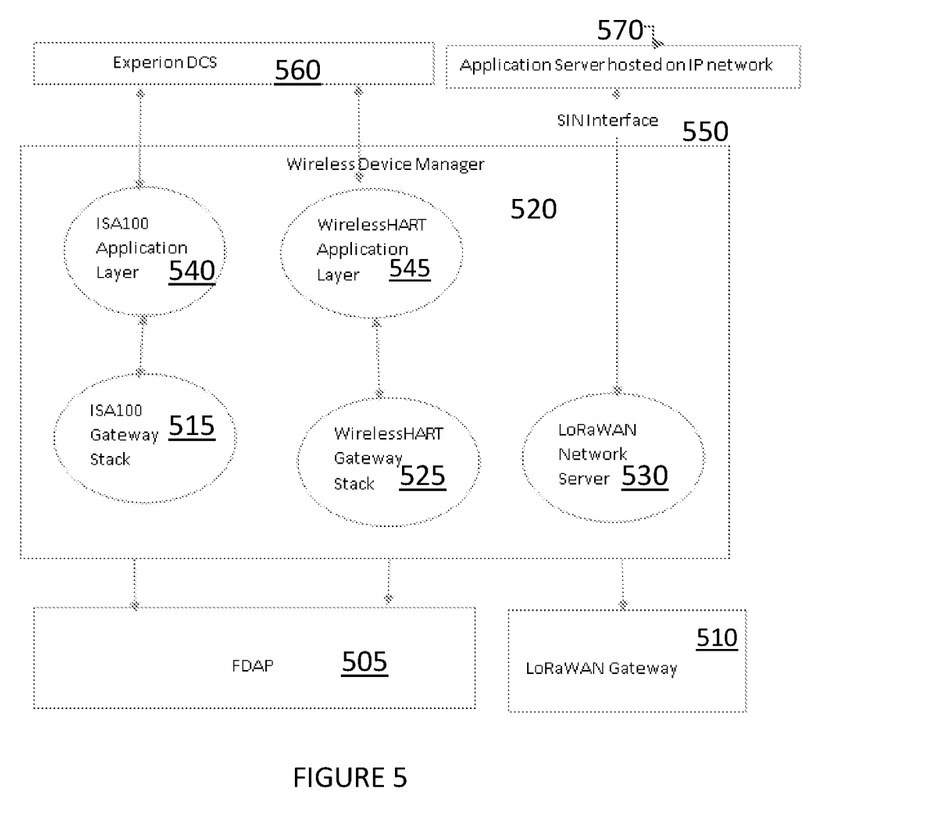
FIG. 5 shows another example of a wireless device manager architecture for LoRaWAN sensors.

In FIG. 5, there are shown FDAP 505 and LoRaWAN Gateway 510. Wireless Device Manager 520 includes ISA100 Gateway stack 515, ISA100 application layer 540, WirelessHART Gateway stack 525, WirelessHart Application layer 545 and LoRaWAN network server 530. A SIN Interface 550 is shown with application server 570 and ExperionPKS™ DCS 560.

The WDM can have one of various architectures for LoRaWAN networks, depending on the implementation. The following shows two example architectures, although other architectures could be used depending on the implementation. The WDM may act as a LoRaWAN network and application server, parse sensor data, and provide the sensor data to an Experion system or other system (such as through Control Data Access or "CDA" for tighter integration).

The application server may run on an IP network or be hosted on a cloud-based platform to enable a specific application server to be run based on the sensor application (such as remote pipeline monitoring, etc.). In some embodiments, the WDM can support gateway edge connectivity to a cloud-based platform, which enables a specific application server to be hosted in the cloud, to receive data (via the WDM) from LoRaWAN sensors, and to monitor/control the LoRaWAN sensors as required from the application server/clients as needed.

An example of the application of the present invention is in remote wellhead monitoring which provides for a solution that is economical, easy to maintain, and easy to deploy. The advantages include there being no need to deploy solar panels, and external power is not needed at the wellhead. In addition, there is no need for installation of an FDAP, RTU/WDM, or an Ethernet switch at the well. There is no backhaul connection needed at the well. It is easier to obtain fast Internet access at a control room than at the well. Longer battery life can be achieved at the sensors, such as due to slower update rates and no need for frequent clock synchronization. Another example of an implementation of the invention is in a remote pipeline monitoring solution that is economical, easy to maintain, and easy to deploy. A long pipeline can be monitoring using LoRa sensors (such as native or XYR6000 LoRa-enabled sensors) installed on the pipeline. The sensors can be connected to a remote location (such as up to about 10 km away) from the pipeline, and the sensors data can be monitored.

One LoRa gateway+WDM can be installed in a radius of about 10 km distance, and one or multiple WDM can be used. Each WDM can connect to a remote or cloud-based platform, where application server/clients are running to analyze the sensor data. Once installed, the sensors can send data over a prolonged period of time (such as about 10-15 years) based on hourly or daily reporting periods.

Additional details regarding the inclusion of a wireless radio supporting long-range communications into a gateway supporting one or more industrial wireless protocols would be familiar to one of skill in the art. Note that these details relate to specific implementations and that other embodiments could differ from these implementations without departing from the scope of this disclosure. For instance, other industrial wireless network protocol(s) could be used instead of or in addition to WirelessHART and ISA100.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    a wireless device manager configured to function as a gateway for at least one industrial wireless network, the gateway associated with at least one industrial wireless network protocol; and
    the wireless device manager comprising a first radio module including long-range wide area network (LoRaWAN) sensors configured to communicate directly with one or more wireless devices over a distance from between about 2 to 1,000 kilometers using a long-range wide area network fLoRaWAN) protocol,
    the wireless device manager further comprising a second radio module including WirelessHART/ISA100 sensors configured to communicate directly with one or more nearby second devices using at least one industrial wireless protocol, the wireless device manager is further configured to function as an access point and field router for the one or more second devices; and
    wherein the access point is configured to use smaller industrial wireless protocol packet sizes when communicating at lower data rates using the LoRaWAN protocol compared to using the at least one industrial wireless protocol.

2. The apparatus of claim 1, wherein the wireless device manager is configured to communicate directly with the one or more wireless devices over a distance of about 50 to 800 kilometers.

3. The apparatus of claim 1, wherein the wireless device manager is configured to function as:
    a gateway for an ISA100 network;
    a gateway for a WirelessHART network; and
    a gateway and an application server for the one or more devices.

4. The apparatus of claim 1, wherein the wireless device manager is field configurable to enable one or more of ISA100, WirelessHART and LoRaWAN protocols in any combination.

5. The apparatus of claim 1, wherein:
    the first radio module forms at least part of an access point; and
    the access point is further configured to communicate directly with one or more nearby second devices using at least one industrial wireless protocol.

6. The apparatus of claim 1, wherein the wireless device manager is configured to receive process variable measurements from the one or more devices only when the one or more devices have determined that the process variable measurements have changed by a specified amount.

7. A method comprising:
    operating a wireless device manager as a gateway for at least one industrial wireless network, the gateway associated with at least one industrial wireless network protocol; and
    operating a first wireless radio including long-range wide area network (LoRaWAN) sensors of the wireless device manager to communicate directly with one or more devices over a distance of about 2 to 1,000 kilometers using a long-range wide area network (LoRaWAN) protocol;
    operating a second wireless radio including WirelessHART/ISA100 sensors, of the wireless device manager to communicate directly with one or more nearby second devices using at least one industrial wireless protocol;
    wherein the wireless device manager further functions as an access point and field router for the one or more second devices, and
    wherein the access point uses smaller industrial wireless protocol packet sizes when communicating at lower data rates using the LoRaWAN protocol compared to using the at least one industrial wireless protocol.

8. The method of claim 7, wherein the wireless device manager communicates directly with the one or more devices over a distance of about 50 to 500 kilometers.

9. The method of claim 7, wherein the wireless device manager functions as:
    a gateway for an ISA100 network;
    a gateway for a WirelessHART network; and
    a gateway and an application server for the one or more devices.

10. The method of claim 7, wherein the wireless device manager is field configurable to enable one or more of ISA100, WirelessHART and LoRaWAN protocols in any combination.

11. The method of claim 7, wherein:
the first radio module forms at least part of an access point; and
the access point communicates directly with one or more nearby second devices using at least one industrial wireless protocol.

12. The method of claim 7, further comprising:
receiving process variable measurements from the one or more devices only when the one or more devices have determined that the process variable measurements have changed by a specified amount.

13. A non-transitory computer readable medium containing instructions that, when executed by at least one processing device, cause the at least one processing device to perform the method of claim 7.

\* \* \* \* \*